(12) United States Patent
Radomsky et al.

(10) Patent No.: US 7,886,766 B2
(45) Date of Patent: Feb. 15, 2011

(54) DEVICE AND SYSTEM FOR MONITORING VALVES

(75) Inventors: Israel Radomsky, Herzliya (IL); Reuben Fuchs, Ra'anana (IL); Israel Kalman, Kfar Saba (IL); Amir Nemenoff, Carcom (IL); Ohad Gal, Tel Aviv (IL)

(73) Assignee: Eltav Wireless Monitoring Ltd., Ranana (IL)

( * ) Notice: Subject to any disclaimer, the term of this patent is extended or adjusted under 35 U.S.C. 154(b) by 1021 days.

(21) Appl. No.: 11/616,381

(22) Filed: Dec. 27, 2006

(65) Prior Publication Data

US 2008/0156121 A1 Jul. 3, 2008

(51) Int. Cl.
*F16K 37/00* (2006.01)
(52) U.S. Cl. .................................. 137/554; 137/552
(58) Field of Classification Search .............. 137/551, 137/554, 552; 700/282; 340/686.3
See application file for complete search history.

(56) References Cited

U.S. PATENT DOCUMENTS

| | | | |
|---|---|---|---|
| 5,730,861 A * | 3/1998 | Sterghos et al. ............ | 137/554 |
| 6,164,324 A * | 12/2000 | Gradle ........................ | 137/554 |
| 6,597,290 B2 * | 7/2003 | Mogi ...................... | 340/686.3 |
| 6,598,454 B2 * | 7/2003 | Brazier et al. ............... | 137/551 |
| 6,843,098 B2 | 1/2005 | Brazier | |
| 6,920,409 B2 | 7/2005 | Essam | |
| 7,218,237 B2 * | 5/2007 | Kates ......................... | 340/605 |
| 2003/0019277 A1 | 1/2003 | Brazier | |
| 2003/0217772 A1 * | 11/2003 | Lu et al. ..................... | 137/554 |
| 2004/0055384 A1 | 3/2004 | Brazier | |
| 2004/0093173 A1 | 5/2004 | Essam | |
| 2005/0087235 A1 * | 4/2005 | Skorpik et al. .............. | 137/554 |
| 2005/0275547 A1 * | 12/2005 | Kates ......................... | 340/605 |
| 2005/0285069 A1 | 12/2005 | Fernandez-Sein | |

FOREIGN PATENT DOCUMENTS

| | | |
|---|---|---|
| CN | 1555468 | 12/2004 |
| DE | 101 28 448 | 1/2003 |
| GB | 2 372 087 | 8/2002 |
| JP | 61 160681 | 7/1986 |
| WO | 03012760 | 2/2003 |

* cited by examiner

*Primary Examiner*—John Rivell
(74) *Attorney, Agent, or Firm*—Martin Fleit; Paul D. Bianco; Fleit Gibbons Gutman Bongini & Bianco PL

(57) ABSTRACT

The invention relates to a network system for monitoring valves in a facility, which comprises: (a) a plurality of valve monitoring devices—VMDs, each monitoring device is affixed to a valve, and comprises: (a.1) a sensor for sensing the status of the valve; (a.2) short range wireless communication unit for transmitting the status as sensed by said sensor, and for transmitting the status as sensed, together with an identification of said device, to one or more Valve Device Readers—VDRs located within said short range; (a.3) mechanism for affixing the device to the monitored valve in a manner which does not disturb the normal operation of the valve; and (a.4) one or more VDRs for receiving the transmission of the valve status and VMD identification from said VMDs, and for forwarding the same to a server by Ethernet communication.

21 Claims, 11 Drawing Sheets

DEVICE AND SYSTEM FOR MONITORING VALVES

FIELD OF THE INVENTION

The present invention relates to the field of systems and devices for monitoring and/or controlling the flow of fluids, particularly in industrial facilities. More particularly, the invention relates to a system and device for monitoring the status of valves in an industrial facility.

BACKGROUND OF THE INVENTION

In today's industrial environment, systems and equipment must perform at levels thought impossible a decade ago. Global competition is forcing industry to continuously improve process operations, product quality, yield and productivity with fewer people than ever before. Production equipment must deliver unprecedented levels of reliability, availability, and maintainability as plant managers seek ways to reduce operational and support costs and to eliminate or minimize capital investments. In short, industry must invoke new measures to improve production performance and safety while minimizing costs and extending the operational life of new and aging equipment.

Sensors and actuators are found in large numbers in every process line. Each and every one of them requires data transmission and power cabling. The use of cables in not only costly to engineer and install, it is also one of the most frequent source of failure in the process line, where a considerable amount of sensors and actuators are moving or exposed to harsh environmental conditions. Therefore, it is here, at the field device level, where problems with wires really exist for the users.

The various field buses which have found their way into most industrial applications in the last decade have not changed the situation. The sensors and actuators are still typically connected via wires in a star topology to bus concentrators, or are connected to the bus in a daisy chain configuration. However, as wires age, they can crack or fail. Inspecting, testing, troubleshooting, repairing, and replacing wires require significant time, labor, and materials. If wiring faults cause a production stoppage, costs escalate rapidly.

Fluid lines are widely used in almost every industrial facility. The fluid flow in the lines is generally controlled by means of valves. Ball valves are key elements in the fluid control, in view of their simple structure and relatively low cost. Although the term "ball valve" is used in this application, and the examples which are given all specifically relate to ball valves, the invention is not limited for use only with this type of valves, but with any type of industrial valve. It is estimated that 70 million industrial ball valves sized ½" to 4" were sold world wide in 2004 alone. There are many typical process facilities which have more than 1000 ball valves. Although the process operators have a very strong desire and need for monitoring ball valves, in view of the costs and complications involved in the wiring and maintenance, about 80% of the ball valves in industrial facilities remain electronically unmonitored.

The control over the process could be significantly enhanced if a remote monitoring of the status of all or most ball valves in a facility, would be provided. However, as said the installation of wired monitor box to monitor the status of each valve is very expensive. The estimated cost for each monitored wired ball valve is in the range of thousands of US dollars due to the implications to lay wires in a process line facility. The cost goes even higher when the cables of the ball valve monitoring device pass through ducts, or when they need to be protected by stainless steel coverage. Sometimes, such a stainless steel coverage protection can increase the costs by 10 times. This is the main result why the industry tends to compromise the rate of monitoring, i.e., by monitoring only a small portion of the ball valves in the facility, generally only those which are considered as critical in the process.

It is therefore an object of the present invention to provide a monitoring device for a ball valve which is of low cost.

It is still another object of the present invention to provide a monitoring device which eliminates the need for very expensive wiring and maintenance.

It is still another object of the present invention to provide a monitoring device for a ball valve which is simple to install on existing installed valves as well as on new valves and maintain them in the field.

It is still another object of the present invention to provide a monitoring device which is more reliable in comparison with the wired ball-valve monitoring devices of the prior art.

It is still another object of the present invention to provide a wireless monitoring device for a ball valve, which is capable of working and operating within a large network of similar devices.

It is still another object of the present invention to provide a wireless monitoring device for a ball valve which has low current consumption, and which therefore requires replacement of batteries relatively rarely.

It is still another object of the present invention to provide means for allowing an operator to retrieve valve device data, such as the valve identification and status, software version, configuration, valve manufacturer, maintenance information, and any stored data received during operation, and insert said device data to the valve device by means of a hand held device from a short range.

It is still another object of the present invention to provide a capability for inserting operator identification to the valve device when the manual valve is actuated.

It is still another object of the present invention to provide the option of installation and calibration of the valve device locally without the need to communicate with the control room.

It is still another object of the present invention to provide a self healing meshed wireless network which yields a very reliable wireless communication even at noisy and obstructed links.

It is still another embodiment of the present invention to provide means for verifying that a desired change in the status of a ball valve has been appropriately performed.

Other objects and advantages of the present invention will become apparent as the description proceeds.

SUMMARY OF THE INVENTION

The invention relates to a network system for monitoring valves in a facility, which comprises: (a) a plurality of valve monitoring devices—VMDs, each monitoring device is affixed to a valve, and comprises: (a.1) a sensor for sensing the status of the valve; (a.2) short range wireless communication unit for transmitting the status as sensed by said sensor, and for transmitting the status as sensed, together with an identification of said device, to one or more Valve Device Readers—VDRs located within said short range; (a.3) mechanism for affixing the device to the monitored valve in a manner which does not disturb the normal operation of the valve; and (a.4) one or more VDRs for receiving the transmission of the valve status and VMD identification from said VMDs, and for forwarding the same to a server by Ethernet communication.

Preferably, the short range communication uses a protocol which is selected from Bluetooth, WiFi, and ZigBee.

Preferably, the system further comprises one or more hand-held operator devices—ODs, for triggering short range communication to a selected VMD when being in proximity to it, thereby receiving from it said status and identification message, for optionally collecting such message from a plurality of VMDs, and for later downloading the one or more messages, as collected, into a control station server, or transmitting it to one or more VDRs via said short range communication.

Preferably, the VMD further comprises a very short range communication unit utilizing Low Frequency (LF) transceiver and protocol for receiving status and measurement information from one or more industrial process sensors that are disposed in a very closed range to the VMD location, and for further including said received industrial process sensors status and measurement information in the VMD transmission to the one or more VDRs.

Preferably, the low frequency very short range unit is a two-way communication unit, and wherein the system further comprises one or more hand-held operator devices—ODs, for triggering said low frequency very short range communication of a selected VMD when being in proximity to it, thereby receiving from it said status and identification message, said OD collecting such messages from one or more of VMDs, and later downloads the one or more messages, as collected, into a control station server.

Preferably, each VMD is battery operated.

Preferably, the attachment mechanism comprises a U-shaped profile.

Preferably, the sensor is optically based sensor.

Preferably, the sensor is based on a potentiometer.

Preferably, the sensor is based on a variable capacitor.

Preferably, the sensor is based on a magnet affixed to the valve stem and a Hall device inside the VMD which measures the angular position by measuring the changing magnetic flux of the magnet while the magnet is rotating.

Preferably, the status transmission by the VMD is performed periodically, upon event, or upon request by short range transmission from the control center via a VDR, or from an operator device OD.

Preferably, the OD acts as a Single HOP Trust Center, admitting a VMD into the system or a said third party device into the facility network.

Preferably, the OD acts as a Single HOP Trust Center, admitting a third party device selected from a VMD, VDR, OD or a process sensor into the system.

Preferably, the OD admits the VMD into the network via a non secure, low transmission power, single hop message, which comprises a security key of the network Preferably, the OD admits the VMD into the network via a non secure very short range, low frequency transmission, which comprises a security key of the network.

Preferably, the OD admits a third party device into the network via a set of very short range changing password keys, from which the last key is the security key of the network.

Preferably, no device can be admitted into the network unless being approved by an OD which acts as a Single Hop Trust Center.

Preferably, the VDR is directly connected to the Ethernet via LAN or wireless LAN.

Preferably, each VDR is accessed through the server via the Ethernet using a given IP address which corresponds to its ZigBee network address.

The invention further relates to a device for monitoring the status of a ball valve, which comprises: (a) a sensor for sensing the status of the valve; (b) short range wireless communication unit for receiving the status as sensed by said sensor, and for transmitting the status of the valve as sensed, together with an identification of said device, to one or more receiving devices located within said short range; and (c) mechanism for attaching the device to the monitored ball valve in a manner which does not disturb the normal operation of the ball valve.

DETAILED DESCRIPTION OF PREFERRED EMBODIMENTS

Figure 1:
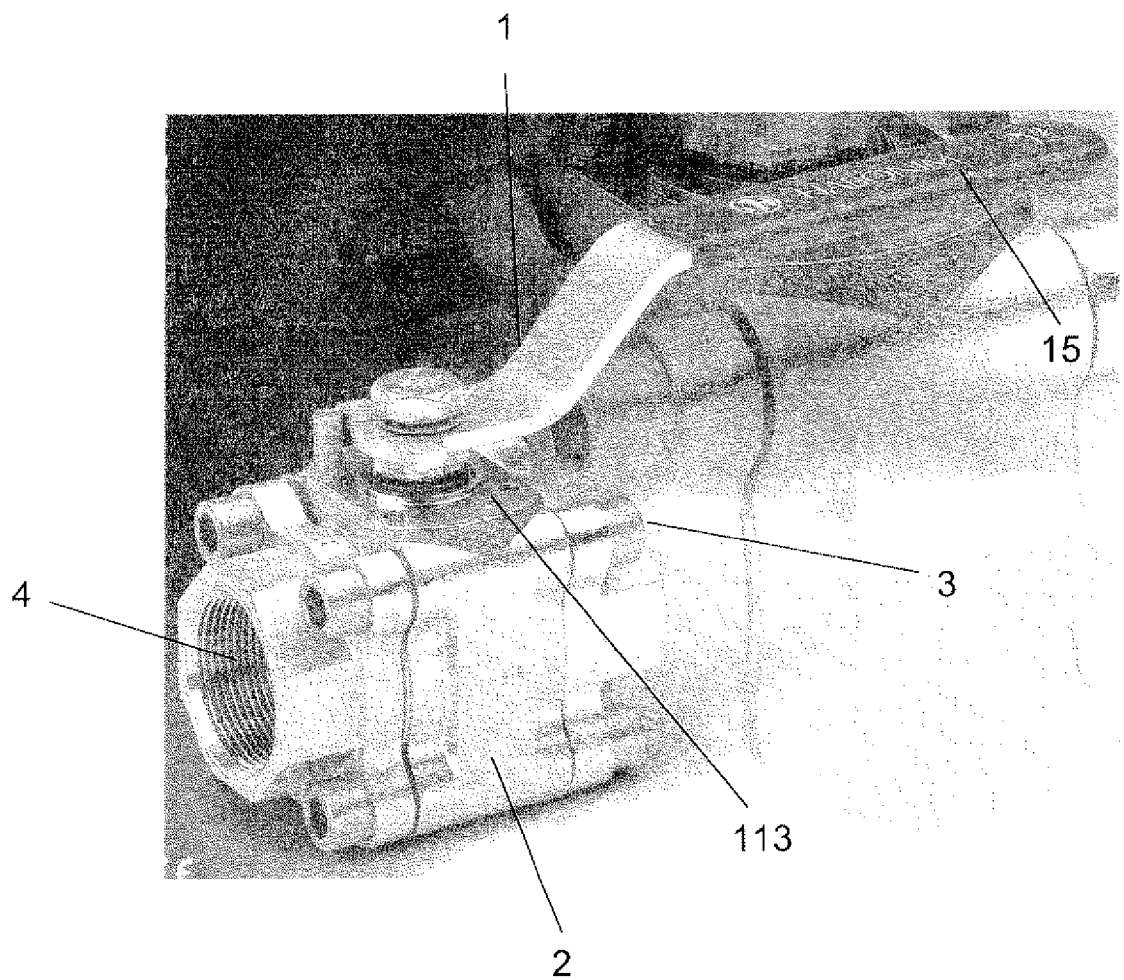
FIG. 1 shows a typical prior art ball valve.

FIG. 1 shows the structure of a typical ball valve 1, such as widely used in the industry for controlling the flow of fluids. Such typical ball valves are generally sized between ½" to 4". The ball valve is installed between two sections of a fluid line, and serves essentially as an OPEN/CLOSE flow switch. The ball valve 1 essentially has a hollow section 2, an inlet 3 and an outlet 4, and a handle 5 for manually opening and closing the valve. As said, the prior art has not yet provided a wireless, and low cost device for monitoring the status of a ball valve, which is reliable, and simple to install and maintain. Moreover, the prior art has not yet provided any wireless means for monitoring a mass number of industrial ball valves, in a manner which is of low cost, simple to install and maintain, and reliable.

The present invention provides a ball valve monitoring device which solves most of the prior art drawbacks which essentially formed a significant burden for the industry to electronically monitor the status of facilities ball valves.

Figure 2A:
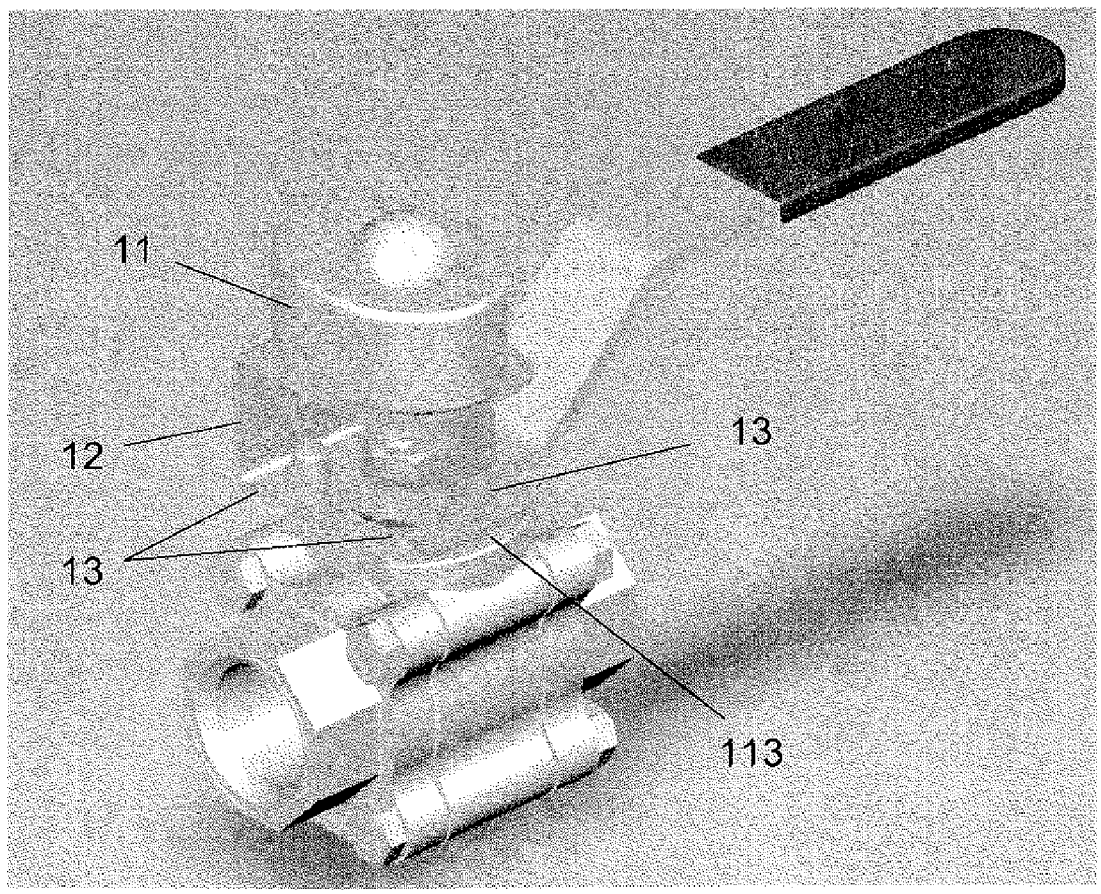
FIGS. 2a and 2b show a typical ball valve which comprises a Valve Monitoring Device (VMD) according to an embodiment of the present invention.
Figure 2B:
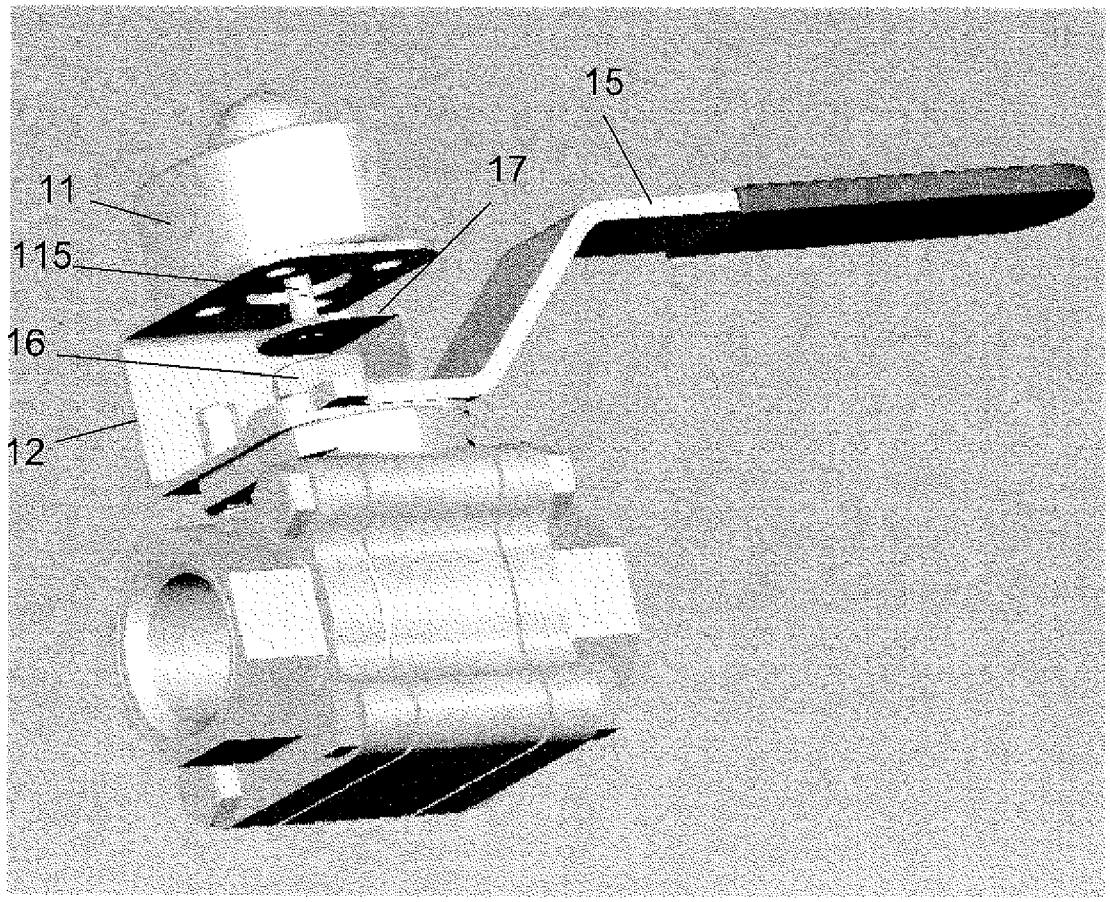

According to one embodiment the present invention, a short-range wireless ball valve monitoring device (hereinafter "MD") is installed on a ball valve, located on a fluid line within the industrial facility. Preferably, the monitoring device is an add-on device, which is adapted to be easily installed on an existing typical ball valve even when said valve is operative. FIGS. 2a and 2b show two different views of such an add-on device. Initially, a U-shaped supporting element is attached to the existing body of the ball valve by one or more screws 13. The monitoring device 11 is attached by any conventional means to the top portion of the supporting element 12. In such a manner, the supporting unit 12 and the monitoring device 11 do not disturb the normal operation of the ball valve. The valve monitoring device (hereinafter VMD) 11 comprises a sensor (not shown in FIGS. 2*a* and 2*b*) for reading the status of the ball valve, and a communication unit (not shown) for periodically, or upon request or event transmitting the status of the ball valve and the identification number of the VMD, to another device located within the range of transmission of said VMD. Said another short rang device may be a Valve Device Reader—VDR, as will be elaborated as the description proceeds.

According to the invention, pluralities of such monitoring devices are installed on ball valves within the facility, to form a network. Each monitoring device is provided with wireless, short-range communication unit, which communicates with other devices or with one or more central units using a short range wireless protocol such as Bluetooth, ZigBee, or WiFi.

The following table summarizes some of the main characteristics of said three protocols:

|  | WiFi | Bluetooth | ZigBee |
| --- | --- | --- | --- |
| Range | ~100 m | ~10 m-30 m | ~10 m-100 m |
| Data Rate | 2-11 Mbps | 1 Mbps | 0.25 Mbps |
| Modulation | DSSS | Frequency hopping | DSSS |
| Power consumption | Medium | Low | Ultra Low |
| Size | Larger | Smaller | Smallest |
| Cost/Complexity | Higher | Medium | Very Low |

It has been found that for the purpose of the invention the protocol of Zigbee is most preferable. ZigBee is a specification for wireless personal area networks operating at 868 MHz, 902-928 MHz, and 2.4 GHz. Using ZigBee, devices in a network can communicate at speeds of up to 250 Kbps while physically separated by distances of up to 100 meters in typical circumstances and greater distances in an ideal environment. ZigBee is based on the 802.15.4 specification approved by the Institute of Electrical and Electronics Engineers Standards Association (IEEE-SA). ZigBee provides for high data throughput in applications where the duty cycle is low. This makes ZigBee ideal for the present devices for monitoring ball valves. The monitoring device of the present invention therefore can operate at low power levels, and this, in conjunction with the low duty cycle translates into long battery life. ZigBee is also compatible with most topologies including peer-to-peer, star network, and mesh networks, and can handle up to 65,000 devices in a single network.

There are various ways by which the reading of the status of the ball valve can be performed by the VMD of the present invention. In the exemplary embodiment of FIG. 2*b*, a small Valve Monitoring Device (VMD) 11 is externally affixed to the valve standard ISO flange 113. The VMD is battery powered (typically about 5 years of battery life) and uses wireless 802.15.4/ZigBee 2.4 GHz protocol to wirelessly transmit and receive messages to and from the VMD 11. The VMD shaft 115 is fastened to the valve stem 16 by a U-shaped bracket 17 in order to transfer the turns of the stem 16 to the VMD 11. A sensor which is associated with the VMD 11 measures the angular position of the VMD shaft 115, i.e., it measures the angular position of the stem 16 in degrees relative to valve flange 113.

The VMD reports the valve status after it senses a move of the lever 15, and possibly also every predetermined time, for example, 15 minutes. Additional sensors may also be included in the VMD device 11. In such a manner, the VMD temperature, the VMD battery status, and other functional parameters may be transmitted with every VMD message.

Figure 3:
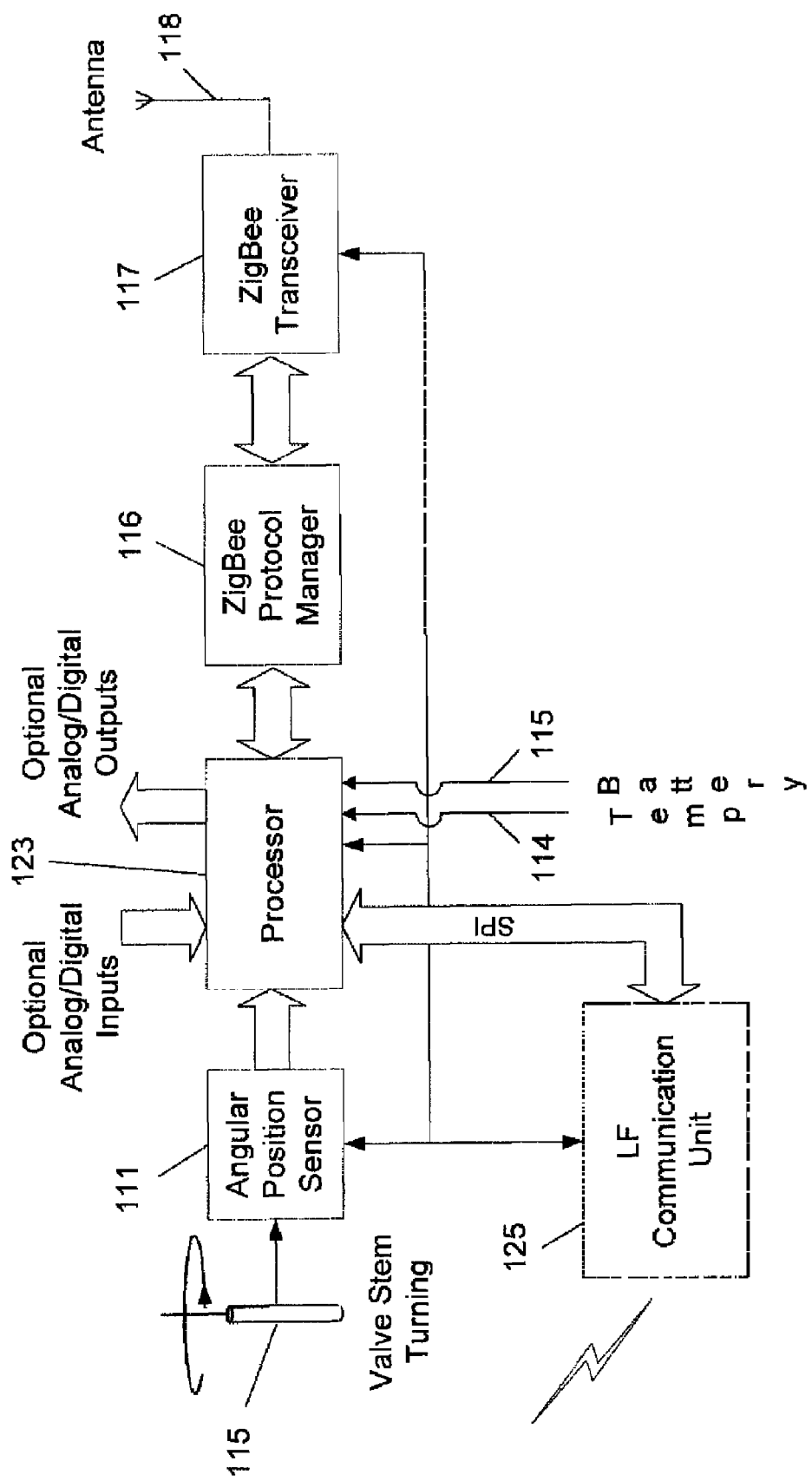
FIG. 3 shows the block diagram of the VMD.

FIG. 3 discloses an exemplary block diagram of VMD 11. An angular position sensor 11 measures the angular position of the valve stem 115. The processor 123 receives the angular position as measured by angular position sensor 111, and it may optionally also receive other data, such as the valve temperature from a temperature sensor (not shown), the battery remained energy 115, and other sensed data from LF communication unit 125 which comprises an LF transceiver 501 (Hereinafter, "LFT", not shown in FIG. 3), as will be elaborated in more detail hereinafter. The processor 123 delivers the data to be wirelessly transmitted to the ZigBee Protocol Manager 116, which in turn arranges the data in the proper order, adds protocol house keeping bytes as is common in the art, and it also manages two way communication with the ZigBee Valve Device Readers (VDR) (not shown). The ZigBee Transceiver 117 receives the signal as arranged, and sends an RF signal via antenna 118. A received signal may also be received via antenna 118 to transceiver 117, which detects the signal, which is then conveyed via the protocol manager 116 to processor 123.

Still in reference to FIG. 2*b*, the sensing of the angular position of the valve stem 16 can be done in various ways. In a first example, shaft 115 is attached to a potentiometer directly or through a gear spur, and said potentiometer position provides an indication to the angular position of the valve stem 16.

Figure 4:
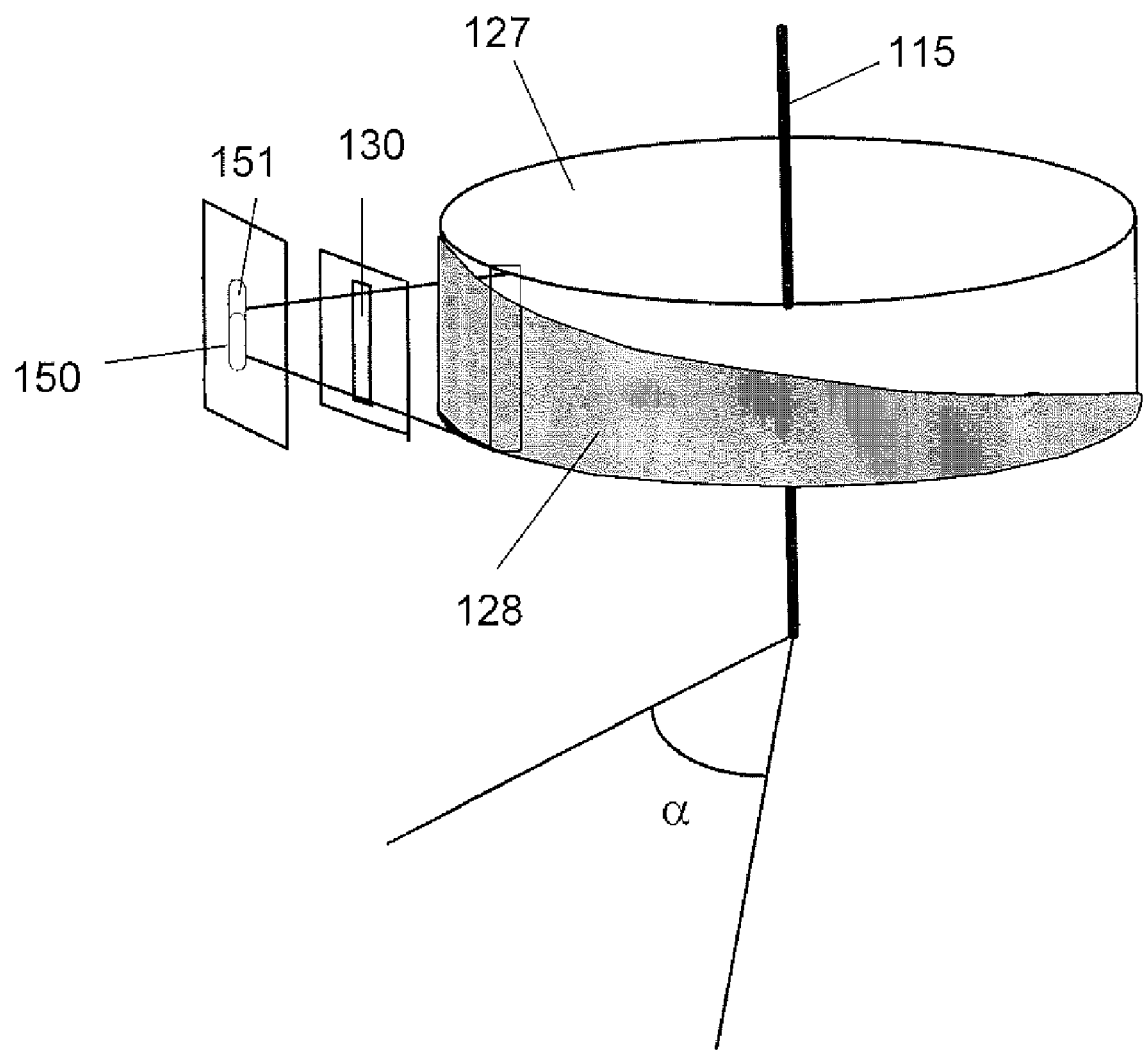
FIG. 4 shows the concept of measuring the angular position of the valve stem with an IR LED and photodiode.

In still another embodiment, the reading of the status of the lever 15 may be performed optically as shown in FIG. 4. For example, light emitting diode 150 emits light toward drum 127 through slit 130, and the reflected light from drum 127, which also passes through slit 130 is detected by photo diode 151. Drum 127 has a gradually changing width of reflecting surface 128. The width of the reflecting surface 128 with respect to the sensing device affects the amount of the light reflected from the drum 127, and therefore indicates the angular position α of lever 15. Alternatively, instead of the changing the width of the reflecting surface 128, a gradually changed gray level of said surface may indicate the position. In still another embodiment, the angular position can be measured by a variable capacitor which its axis is attached to shaft 115.

Figure 7:
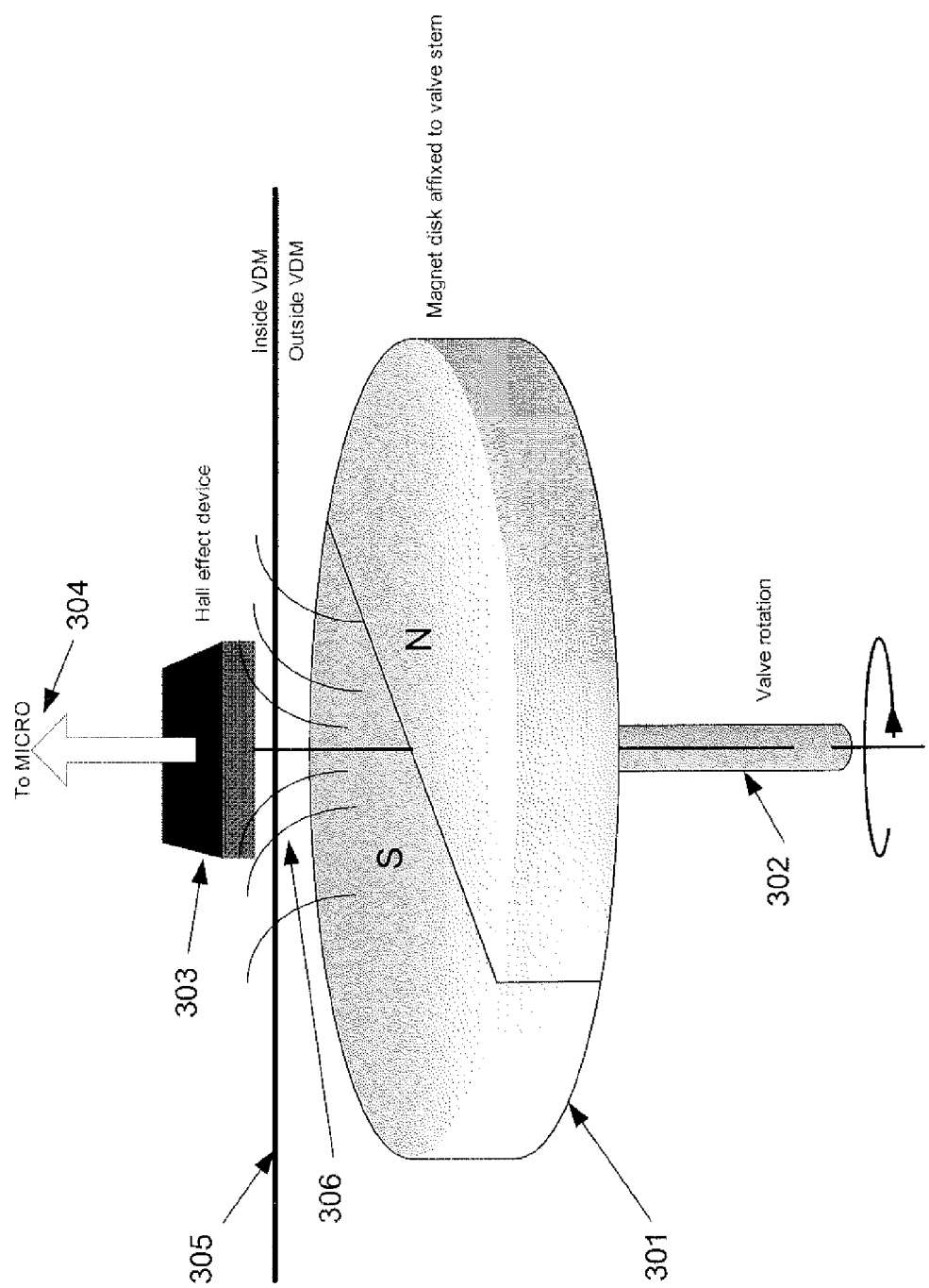
FIG. 7 shows a non-contact method using a rotating magnet attached to the valve stem and a Hall device which measures the magnetic flux and hence the angular position of the valve.

In FIG. 7, a non-contact arrangement for measuring the angular position of the valve stem is shown. In this arrangement, a disk magnet 301 is affixed to the turning valve stem 302. A Hall-effect device 303 is mounted inside the VMD. Turning the magnet causes a coplanar with the Hall device surface magnetic flux 306 to change with the rotation of the magnet. This allows the Hall-effect device 303 with the correct magnetic circuit to decode the absolute rotary (angular) position from 0 to 360 degrees. The Hall-effect device delivers a signal 304 to the processor which is proportional to the angular position of the valve stem 302 with respect to valve body. Such a Hall device is common in the industry and available from many vendors. Since magnetic flux penetrates plastic, the measurement is done without contact through the VD body 305.

Figure 5:
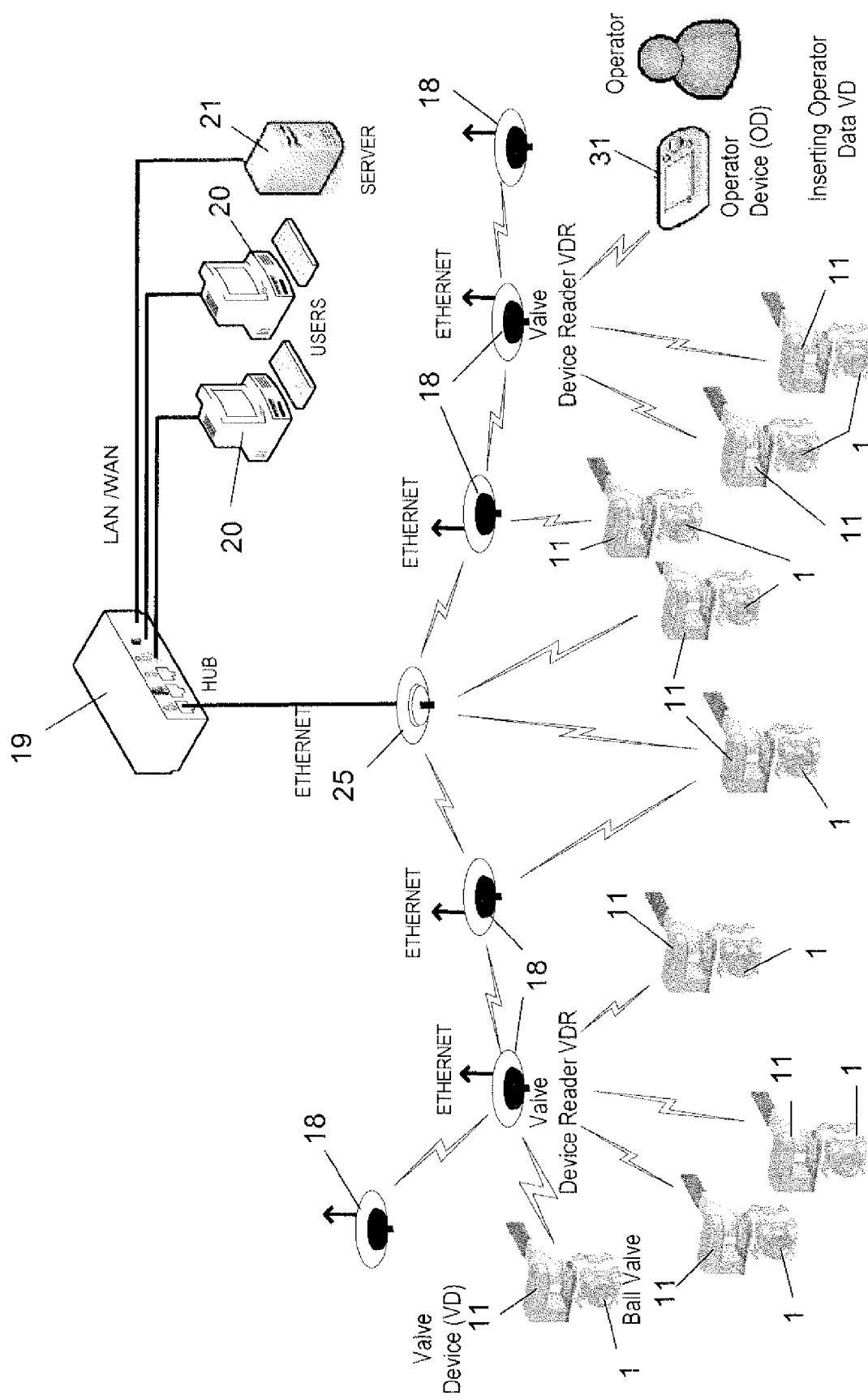
FIG. 5 shows a system for monitoring ball valves, according to an embodiment of the present invention.

FIG. 5 discloses the entire system block diagram. Valve Monitoring Devices (VMD) 11 broadcast data to Valve Device Readers (VDRs) 18 installed in the process line.

FIG. 5 discloses a general structure of a system for monitoring the status of ball valves, according to an embodiment of the present invention. The system comprises plurality of wireless VMDs 11, which are attached each to a ball valve. Each VMD transmits its status, either periodically, or upon request or upon event in ZigBee protocol to a valve reading device 18 (hereinafter VDR), which is located in a range of no more than 50 meters from the VMD. A VDR 18 may be in communication with one or more VMDs 11 using ZigBee protocol. There may be several VDRs 18 within the facility that each communicates one with another or with a Gateway/Personal Network Coordinator (PAN) 25 via Ethernet. Each VDR 18 is connected to the site network by wire, or uses a wireless LAN, or uses another VDR 18 as a router that retransmits the messages it receives to another VDR 18.

The distance between one VDR 18 and another is preferably no more than 100 m. The extended range of the VDR to VDR communication is due to higher RF power of the VDR transmitter, better noise figure of the VDR receiver, and higher gain antenna on the VDR, compared to the transceiver VMD similar elements. One or more VDRs 18 are connected via Ethernet (LAN or wireless LAN) to monitoring stations 20 of the facility, and to server 21 via Gateway/Coordinator 25 and hub 19.

ZigBee protocol defines two types of devices, the Full Function Device (FFD) and the Reduced Function Device (RFD). The FFD contains a complete set of ZigBee services and is therefore most suitable for network Gateway/Coordinator 25 or VDR 18. The VMD preferably employs the RFD which contains a reduced set of the services, a fact which can significantly reduce the cost of each VMD.

Various topologies available with ZigBee can be used according to the present invention. A first topology that may be used is a star, and it is formed around a Full Function Device (FFD) that designates the Gateway/PAN Coordinator 25 which acts as a hub with a collection of additional FFD or RFD that delivers the received messages to the system server. In this regard, the Gateway/PAN Coordinator 25 receives messages through the wireless ZigBee channel and retransmits them through the Ethernet channel to the system's server 21. Every VDR 18 can act on the network in this mode if it is connected to the hub (in this case Gateway/Coordinator 25), either by cable or by WiFi. However, only one VDR 18 can act as a PAN Coordinator 25 which stores all the network routing tables.

A second topology that may be used enables peer-to-peer communication without the direct involvement of a designated network Coordinator 25, although a PAN coordinator 25 is required somewhere in the network to store the routing tables. This topology allows installing a wireless VDR 18 in a place where it is difficult to lay out a network cable (however, DC power must be delivered to the reader from local source), and the VDR 18 will retransmit using ZigBee wireless channel the messages it receives from the various VMDs 11 to one or more other VDRs 18, which are wired to the hub 19, according to the routing tables.

Regardless of type of network employed, according to the present invention each network device preferably employs a Carrier Sense Multiple Access-Collision Avoidance (CSMA-CA) protocol to avoid wasteful collisions when multiple simultaneous transmissions might otherwise occur.

The CSMA-CA protocol is based on the shared nature of the ZigBee RF channel. Whenever two or more senders are active on the channel simultaneously, the probability that any one of them is successful in sending a message decreases due to collisions and their mutual interference. In the ZigBee RF environment, a great deal of the actual interference depends on the location of the competing transmitters, but the location information not available to the transmitting devices. One way to avoid collisions in the channel is to listen first and to transmit only if the channel is clear. The carrier sense ensures access to the clear channel and the possibility of a collision is reduced. In this fashion, the channel capacity is more fully utilized.

ZigBee employs a simple full-handshaking protocol to ensure reliable data transfer and good quality of service. With the exception of broadcast frames and the acknowledgement frame, each received frame may be acknowledged to assure the transmitting device that its message was, in fact, received. If a requested acknowledgement frame is not received by the transmitting device, the entire transmitted frame is repeated. To detect that a message has been received correctly, a Cyclic Redundancy Check (CRC) is preferably used. The message bits are treated as a long binary number and divided by a relatively large prime number. The quotient of the division is discarded, and the reminder of the division with the same prime number is performed at the receiver, and a match signifies a high probability of uncorrupted communication.

The communication employed in the system uses self healing technology. If because of any reason the communication link between particular VMD 11 through some VDRs to the Gateway 25 is deteriorated, the system will select another route from the VD toward the Gateway, through other VDRs 18 in order to employ better level of communication to insure reliable delivery of the data from VMD 11 to the Gateway.

Figure 6:
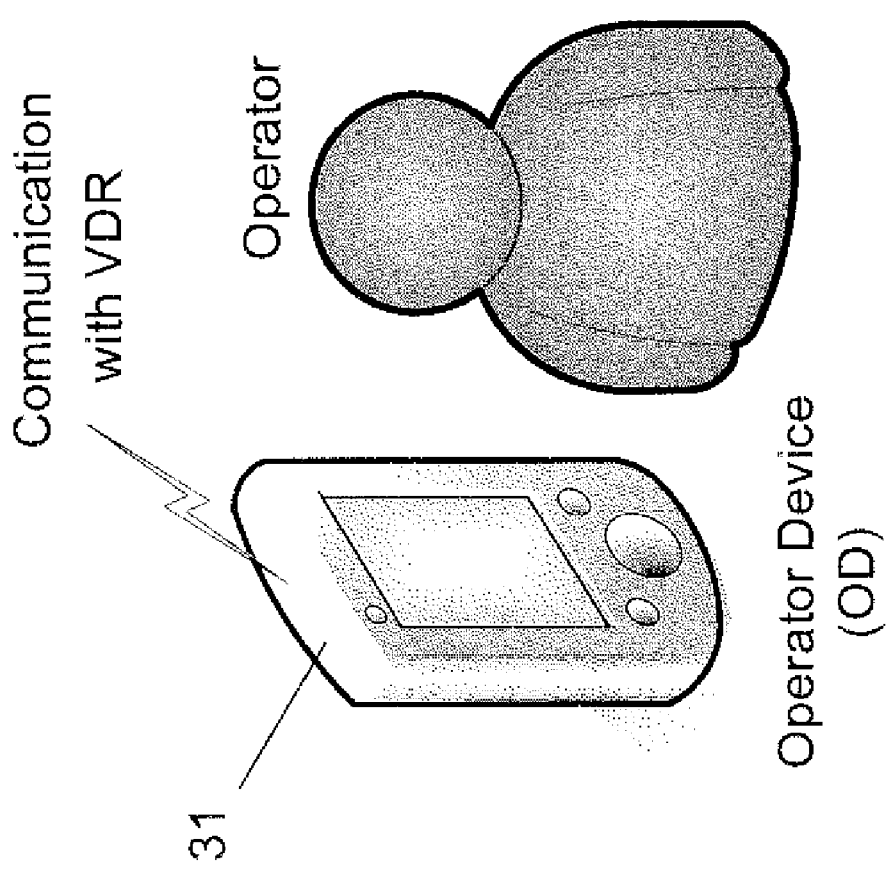
FIG. 6 shows and operator device according to an embodiment of the present invention.

The system of the invention may further comprise one or more operator devices 31 (hereinafter OD). FIG. 6 shows an operator device according to an embodiment of the invention. Operator device 31 may be, for example a PDA, or a similar hand-held device which has a display, processing unit, memory storage, and a communication unit for short-range communication, such as ZigBee protocol, or a Low Frequency (LF) very short range magnetic communication.

Figure 8:
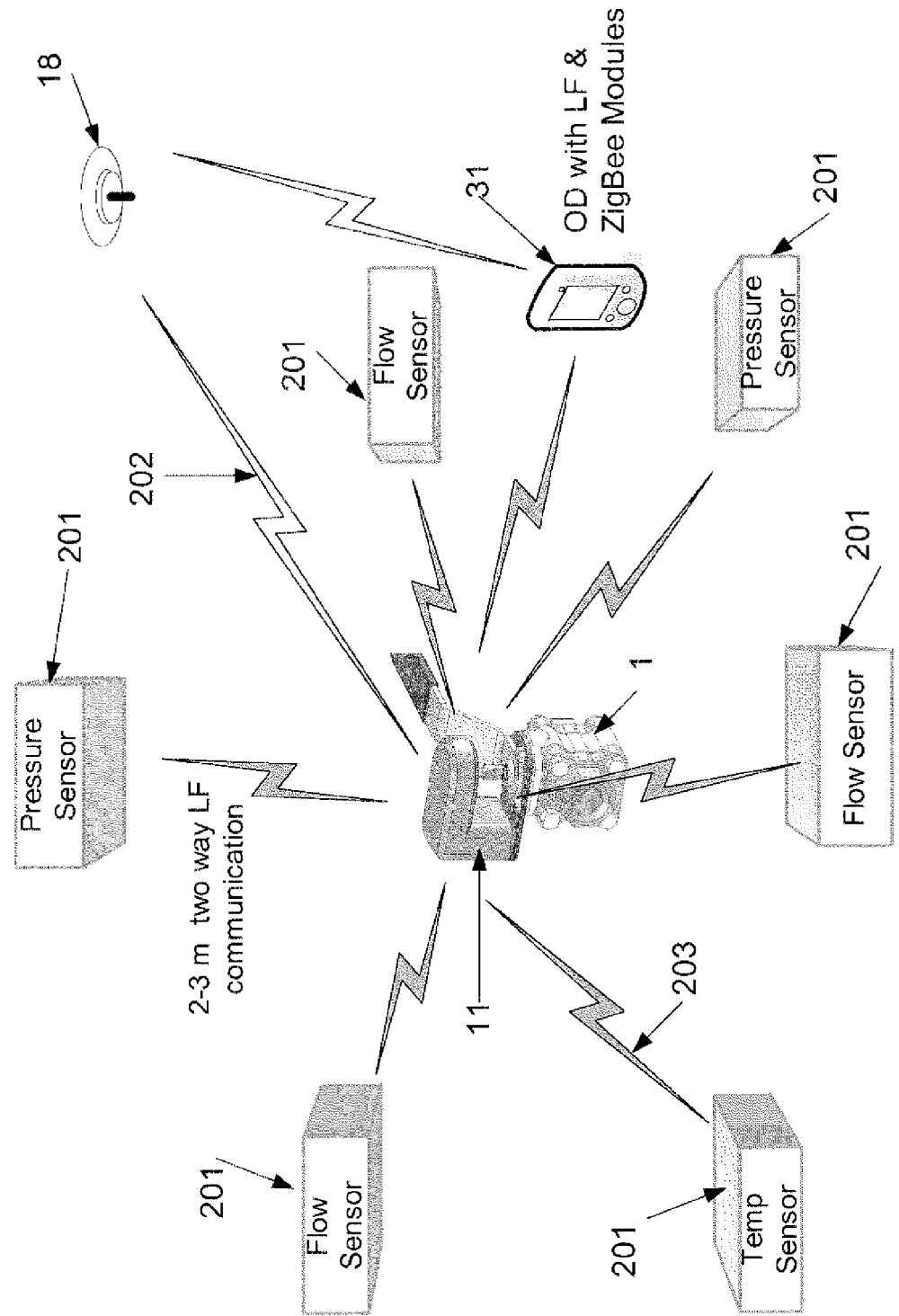
FIG. 8 shows a Micro Network layout where various wireless sensors communicate with the VMD by means of an LF communication.

In still another embodiment of the invention, the VMD 11 may further comprise an LF communication unit 125 (shown in FIG. 3). The LF communication unit 125 allows very short range (several meters) two-way communication between the OD 31 and the VMD 11. Furthermore, this communication can be used for receiving data from process sensors that are disposed in the vicinity of the VMD as shown in FIG. 8. This communication consumes very little power both in the process sensor and in the VMD. Since the LF communication is a magnetic one which decays as $1/R^3$ (R being the range) the range of the LF communication is few meters thus a very little interference is generated with other VMDs.

The OD 31 is used by an operator of the facility for receiving tasks, storing them, and for reporting updates to the main system by means of communication with a VDR 18. The following is an example for the manner of operation of the operator device 31.

Stage 1

A command is initiated in the control room—"close valve #C24".

The command is transmitted through ZigBee to OD 31 and displayed on its display. The OD 31 sends a technical acknowledgment of reception.

The operator has to acknowledge reception on his OD 31 by pressing ACK.

Stage 2

The operator brings its OD 31 close to valve #C24 and presses the VD button (to transfer operator ID to VD). This message is received also by a VDR and stored.

The Operator closes valve #C24.

The Valve Device 31 transmits status change to VDR/control room including Operator ID.

The Operator can scroll on his OD 31 display through his last actions by pressing the scroll button.

The OD can be used also for monitoring the exact status of the valve without the need to be in the control room to monitor the valve position.

The OD is optionally also used as an installation and calibration tool. After the VMD is installed on a valve (in the field), the valve is set to 0 degree and the OD is set also to 0 degree and this information is fed to the VMD. The same process is repeated at 90 degree.

The OD can be used to associate the specific VMD to the valve it is attached to. The operator has to punch the ID of the valve onto his OD and this information is fed to the VMD. From this point on, the VMD reports its ID as well the ID of the valve it is attached to.

In another variation of the invention, the OD 31 acts as a "Single HOP Trust Center".

The OD 31 can be used to admit the specific VMD into the ZigBee network. The admittance password can be supplied directly either by a ZigBee transmission, or preferably by a LF message. In the last case, the factory ZigBee network password is never compromised.

The OD can be also used to admit a third party device (hereinafter "TPD") into the ZigBee network. The admittance password can be supplied either directly, or preferably by a set of changing random passwords in the following manner:
1. An OD establishes a private secure network in the same network physical channel, allowing unsecured joining;
2. TPD joins the OD private network and receives a network key;
3. OD sends a private message to the TPD asking him to change its network password to a new randomly selected password;
4. TPD switches to the new random network key;
5. OD switches to the new random network key;
6. Step 3 through 5 are repeated several times;
7. OD admits TPD to the factory network by sending the TPD the factory network key.

In still another embodiment of the invention, the VMD of the present invention may deliver commands to an actuator, which is in turn attached to a valve. Such actuators are well known in the art. The two way communication between the VMD and the Central Computer allows to implement this functionality by sending down the link from the PC toward the VMD the commands which in turn are delivered to the actuator. In such a case, the VMD is used to determine the status of the remotely actuated valve, thus the entire communication between the actuated valve and the Gateway is wireless.

In still another embodiment of the invention, the VMD of the present invention is installed on any actuated valve, which is commanded from the control room by wires, however, the monitoring of the status of the actuated valve is provided by a wireless link. This partially simplifies the installation by eliminating the monitoring wires.

In still another embodiment of the invention, the LF communication between the OD and the VMD is employed as a micro network to provide short range communication between sensors in the vicinity of the VMD and the VMD. FIG. 8 shows a valve 1 with a VMD 11 on top of it, communicating with various sensors 201 in the vicinity of the valve. The communication between the VMD 11 and the sensor 201 is a two way Low Frequency communication 203. OD 31 is also one of the devices communicate with the VMD 11. The OD (31) has also ZigBee communication module 202 which enables it to communicate with the network infrastructure. Each sensor 201 collects data by its physical transducer (temperature, pressure, flow, etc.) and at predefined time slots sends its data to the VMD 11. This LF transmission 203 wakes up the VMD 11 electronics, which in turn processes the received LF data and retransmits it through the ZigBee link 202 to the network infrastructure.

Figure 9:
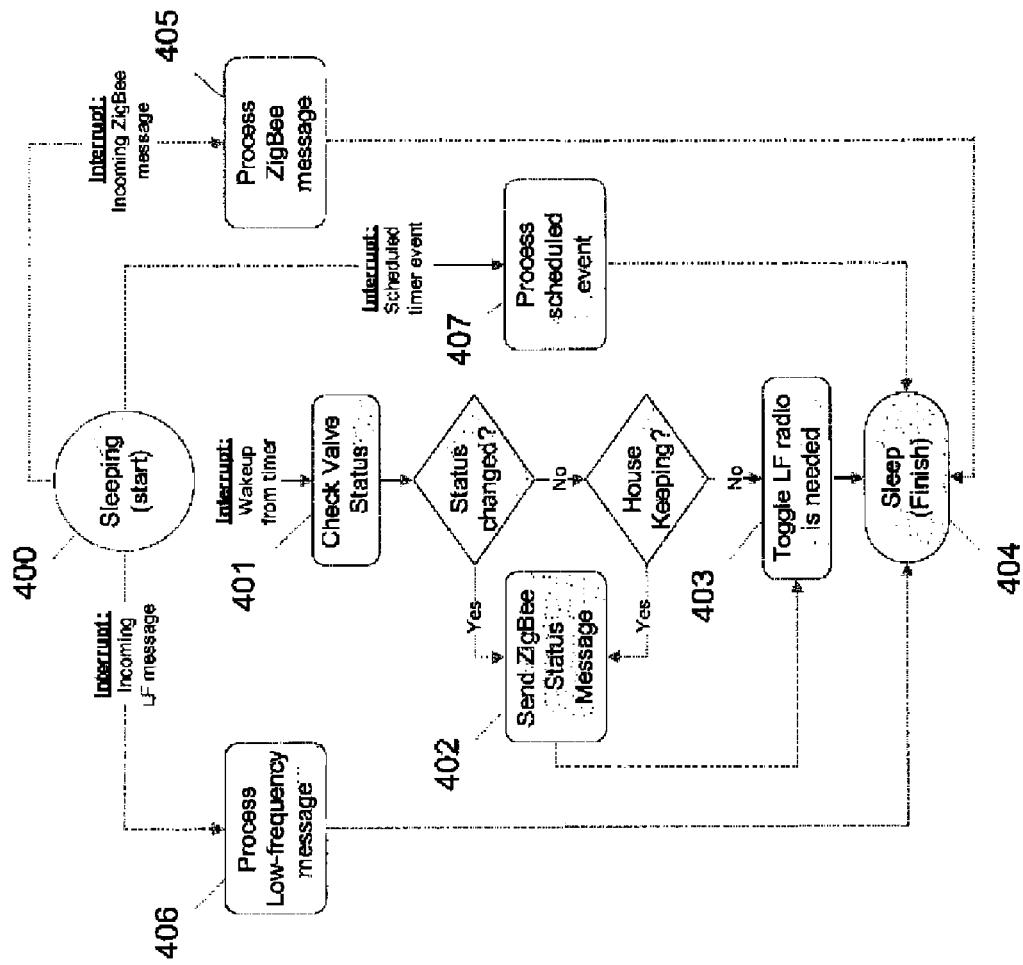
FIG. 9 shows a flow chart diagram of the VMD.

An exemplary VMD 11 flow chart is shown in FIG. 9. The general cycle of the VMD flow chart starts in the sleep mode 400. Sleeping can be interrupted by one of the following manners:
1. Scheduled timer interrupt,
2. Service request from the VDR transceiver (the transceiver must be enabled previously via a LF command from the OD 31);
3. Incoming message from the Low Frequency transceiver LFT while the LFT is powered ON.

A scheduled timer interrupt can be one of the following
1. Valve status needs to be checked 401;
2. Scheduled event 405 received from the system server such as:
   a. Change network password;
   b. Start software upgrade;
   c. Send actuation command.

Once valve status is checked 401, the VMD decides upon the three options:
1. If the valve status has changed, a ZigBee message is compiled (the message comprises the valve angle, temperature, battery status, etc, as previously mentioned) and sent immediately 402.
2. If the status of the valve has not changed, the VMD 11 checks if a predetermined time has passed from the last valve status message. If so, a house keeping message is compiled and sent immediately.
3. As long as a predetermined time from the last valve status has not passed, a status message is not sent.

The VMD now checks if the state of LFT needs to be changed (the low frequency radio works in a low duty cycle in order to preserve battery life) and if so, it toggles the power to the LFT 403 accordingly.

Once these steps are performed, the VMD 11 goes back to sleep.

The VMD can also be woken-up by a service request from the VDR. Typically, this means that an incoming message received by the transceiver, waits for processing. The VMD processes the service request 405, and once finished, goes back to sleep.

The VMD can be also woken-up by an incoming transmission from the LET 406. The VMD receives the message, processes it, replies if necessary, and goes back to sleep.

The VMD can also be woken-up by a scheduled event. A scheduled event comes in the form of a message sent either from the network server or any other device in the network or any sensor or actuator on the micro network. The message is processed and a timer event is assigned to it. Once the set timer elapses, the VMD is woken-up to execute it 407. Once executed, the VMD 11 goes back to sleep.

Figure 10:
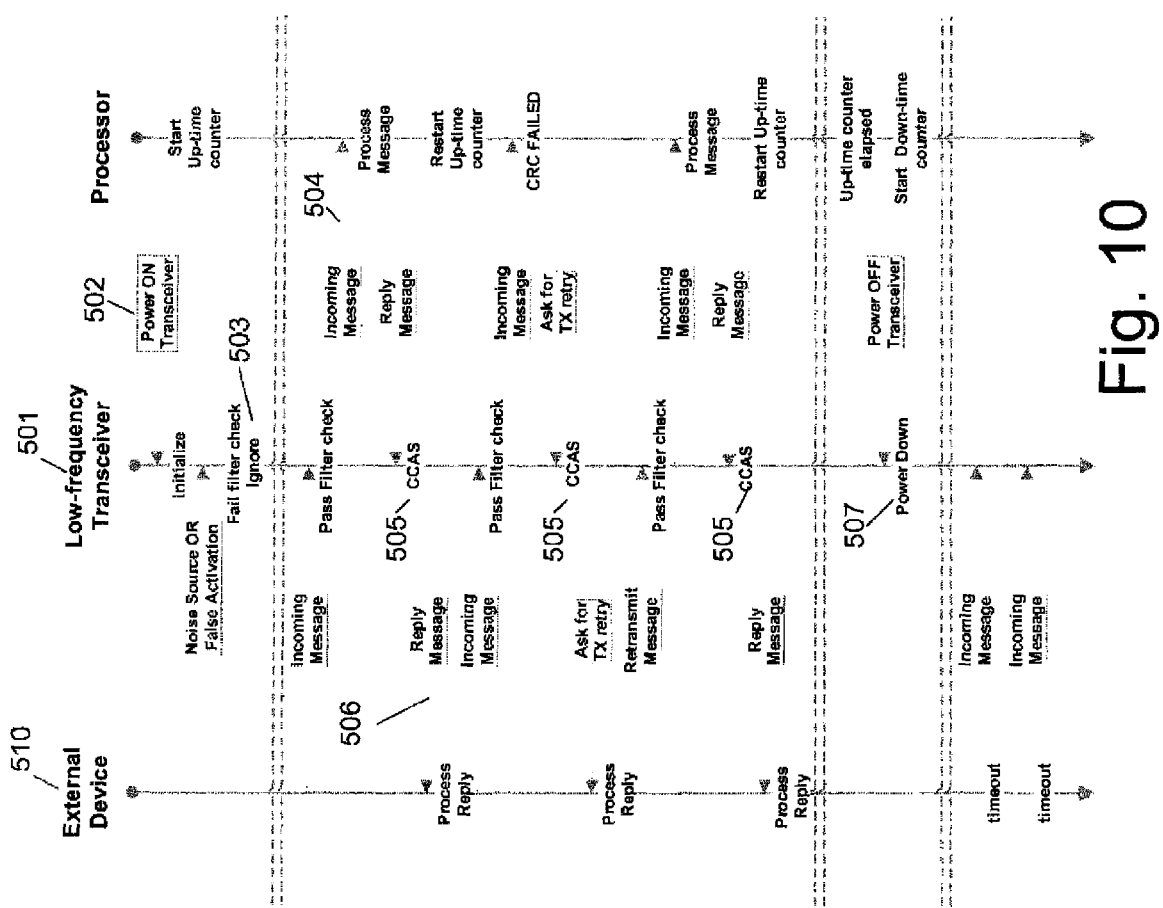
FIG. 10 shows exemplary sequence diagram of the LF communication.

An exemplary sequence diagram describing the LF communication, including the interaction between an external device 510 (such as process sensor 201 or OD 31) the LFT 501, and the processor 123 is shown in FIG. 10. The LFT 501 is activated in a low duty cycle in order to preserve the battery power. Once powered ON 502 by the VMD, the LFT waits in a reception mode for an incoming transmission.

Any incoming transmission must pass an enabling filter 503. Once the transmission passes the enabling filter 503, the VMD receives an interrupt 504 for an incoming message; otherwise, the transmission is ignored.

Upon receiving an LF transmission, the VMD checks the CRC of the message. If the CRC fails, a "CRC fail message"

is compiled, otherwise, the VMD processes the incoming message and compiles a relevant reply.

Before sending a reply, the VMD checks for CCAS 505 (Clear Channel Assessment—meaning that no one else is currently transmitting). If the channel is clear, the VMD sends a reply 506. Otherwise, the VMD waits a random short period and retries.

After an "up time" counter elapses, the VMD powers down 507 the LFT. The "up time" counter is restarted upon reception of each incoming transmission, in order to ensure a continuous connection to any device currently communicating with the VMD.

After a "down time" counter elapses, the VMD powers up the LFT. During the power down period, the VMD can not receive any incoming LF message. The external devices are therefore instructed to retry sending the same message for a predetermined period.

The micro network can include the following functions
1. PDA functions:
   a. Perform initial setup for the VMD, calibration, ZigBee transmission enabling (so that considerable battery power can be saved once the device is not installed);
   b. Allocate a device—sending a "LED flash" command;
   c. Perform an LF link quality check;
   d. Initialize external sensors and actuators in the micro network;
2. Sensor functions:
   a. Send collected data to the VMD, to be further sent via the ZigBee network to the network server;
   b. Receive a real-time clock from the VMD;
   c. Receive a scheduled event;
3. Actuator functions:
   a. Send status to the VMD, to be further sent via the ZigBee network to the network server;
   b. Receive a real-time clock from the VMD;
   c. Receive a scheduled event;
   d. Receive an online command for execution;

As shown, the present invention provides a system by which the status of plurality of ball valves within a facility can be monitored as well as local physical sensors. The system comprises wireless elements, such as VDRs and VMDs that are of relatively low cost, and which can easily be adapted to operate with existing and typical ball valves. The system of the present invention can easily be installed within an existing and typical industrial facility, is simple to maintain, includes elements of low cost, and is very reliable.

The invention claimed is:

1. A network system for monitoring ball valves within an industrial facility, which comprises:
   a. a plurality of add-on valve monitoring devices—VMDs, each VMD is affixed externally to an existing ball valve, and comprises:
   a sensor for sensing the angular position of the ball valve;
   short range wireless communication unit for transmitting at least immediately upon sensing any change in said ball valve angular position a status message which includes the new angular position of the ball valve as sensed by said sensor and an identification of said VMD; and
   mechanism for affixing the add-on VMD to the monitored ball valve in a manner which does not disturb the normal operation of the ball valve; and
   b. one or more Valve Device Readers—VDRs located a short range from one or more of said VMDs for receiving said status messages, and for forwarding the same to a server by Ethernet communication.

2. System according to claim 1, wherein the short range communication uses a protocol which is selected from Bluetooth, WiFi, and ZigBee.

3. System according to claim 1, which further comprises one or more operator hand-held communication devices—ODs, for triggering a selected VMD it to send its status message; receiving by the OD said status message; optionally receiving and storing by the OD plurality of such status messages as received from plurality of VMDs; and downloading the stored messages from the OD to a control station server or transmitting them to one or more VDRs via said short range communication.

4. System according to claim 1, wherein each VMD is battery operated.

5. System according to claim 1, wherein the attachment mechanism comprises a U-shaped profile.

6. System according to claim 1, wherein the sensor is optically based sensor.

7. System according to claim 1 wherein the sensor is based on a potentiometer.

8. System according to claim 1 wherein the sensor is based on a variable capacitor.

9. System according to claim 1 wherein the sensor is based on a magnet affixed to the ball valve stem and a Hall device inside the VMD which measures the angular position by measuring the changing magnetic flux of the magnet while the magnet is rotating.

10. System according to claim 1, wherein the transmission of a status message is further performed by the VMD periodically, or upon receipt of request by means of a short range transmission received from the control center via a VDR or from an operator device OD.

11. System according to claim 3, wherein the OD acts as a Single HOP Trust Center, admitting a VMD into the system or a third party device into the facility network.

12. System according to claim 3, wherein the OD acts as a Single HOP Trust Center, admitting a third party device selected from a VMD, VDR, OD or a process sensor into the system.

13. System according to claim 11, wherein the OD admits the VMD into the network via a non secure, low transmission power, single hop message, which comprises a security key.

14. System according to claim 11, wherein the OD admits the VMD into the network via a non secure very short range, low frequency transmission, which comprises a security key.

15. System according to claim 11, wherein the OD admits a third party device into the network via a set of very short range changing password keys, from which the last key is the security key of the network.

16. System according to claim 11, wherein no device can be admitted into the network unless being approved by an OD which acts as a Single Hop Trust Center.

17. System according to claim 1, wherein the VDR is directly connected to the Ethernet via LAN or wireless LAN.

18. System according to claim 1, wherein each VDR is accessed through the server via the Ethernet using a given IP address which corresponds to its ZigBee network address.

19. A network system for monitoring valves within an industrial facility, which comprises:
   a plurality of valve monitoring devices (VMD), each of said plurality of VMD's affixed externally to an existing valve, and comprises:
   a sensor for sensing an angular position of the valve;
   a short range wireless communication unit for transmitting a status message, each status message includes the angular position of the valve as sensed by said sensor, together with an identification of said VMD, wherein said status message is transmitted at least immediately upon sensing a change in said valve angular position; and a mechanism for affixing at least one of the plurality of VMDs to the monitored valve in a manner which does not disturb the normal operation of the valve; and at least one Valve Device Readers (VDR) located within a short range of at least one of the plurality of VMDs for receiving from said VMDs said status message transmissions, and for forwarding the same to a server by Ethernet communication, wherein each of the plurality of VMD further comprises a very short range communication unit utilizing Low Frequency (LF) transceiver and protocol for receiving status and measurement information from one or more industrial process sensors that are disposed in a very close range to said VMD location, and for further including said received industrial process sensors status and measurement information in the VMD status message to the one or more VDRs.

20. System according to claim 19, wherein the low frequency very short range unit is a two-way communication unit, and wherein the system further comprises one or more hand-held operator devices—ODs, for: (a) triggering said low frequency very short range communication of a selected VMD, when being in proximity to it, to send its status message; (b) receiving by the OD said VMD status message; (c) collecting by the OD such messages from one or more of VMDs; and (d) downloading the one or more messages, as collected, into a control station server.

21. Add-on battery operated Valve Monitoring Device—VMD, which is affixed externally to an existing ball valve for monitoring the status of the ball valve within an industrial facility, which comprises:

a sensor for sensing the angular position of the ball valve;

short range wireless communication unit for transmitting to one or more Valve Device Readers—VDRs located within said short range a status message, each status message includes the angular position of the ball valve as sensed by said sensor, together with an identification of said VMD, wherein said status message is transmitted at least immediately upon sensing any change in said ball valve angular position; and mechanism for attaching the device to the monitored ball valve in a manner which does not disturb the normal operation of the ball valve.

* * * * *